July 28, 1925.  1,548,008

B. P. JOYCE ET AL

AUTOMATIC CONTROL VALVE

Filed Sept. 20, 1923

INVENTOR
Bryan P. Joyce
BY Dayton A. Gurney
W. M. Roach
ATTORNEY

Patented July 28, 1925.

1,548,008

UNITED STATES PATENT OFFICE.

BRYAN P. JOYCE, OF DAVENPORT, IOWA, AND DAYTON A. GURNEY, OF CARO, MICHIGAN.

AUTOMATIC CONTROL VALVE.

Application filed September 20, 1923. Serial No. 663,911.

(GRANTED UNDER THE ACT OF MARCH 3, 1883; 22 STAT. L. 625.)

*To all whom it may concern:*

Be it known that we, BRYAN P. JOYCE and DAYTON A. GURNEY, citizens of the United States, and residents of Davenport, county of Scott, and State of Iowa, and Caro, in the county of Tuscola and State of Michigan, respectively, have invented an Improvement in Automatic Control Valves, of which the following is a specification.

The invention described herein may be used by the Government, or by any of its officers or employees in prosecution of work for the Government, or by any other person in the United States, without payment to us of any royalty thereon, in accordance with the act of March 3, 1883.

The present invention relates to automatic control valves.

While the valve of our invention may be found advantageous in a number of varied uses it has been found particularly useful in gun recoil cylinders, as a control for counter recoil.

The primary object of our invention is the provision of a valve which may be readily opened on application of a suitable force as, for instance, suction, and which will automatically close when the application of that force ceases.

Another object is the provision of such a valve which has further embodied therein a means for adjustably throttling the fluid admitted in an open position of the valve through said valve when closed on the application of pressure to said fluid.

With the foregoing and other objects in view, our invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of our invention is illustrated in the accompanying drawing in which—

Figure 1:
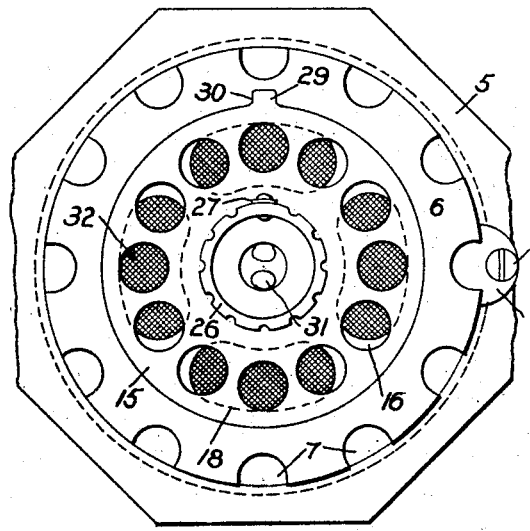
Fig. 1 is a view in rear elevation of our valve.
Figure 2:
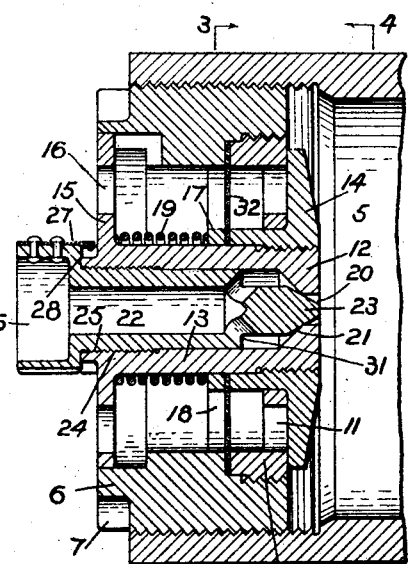
Fig. 2 is a vertical section through the valve.
Figure 3:
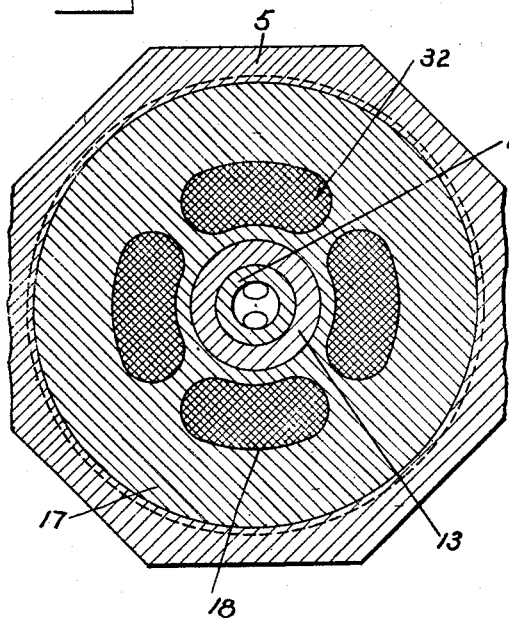
Fig. 3 is a section on the line 3—3 of Fig. 2.
Figure 4:
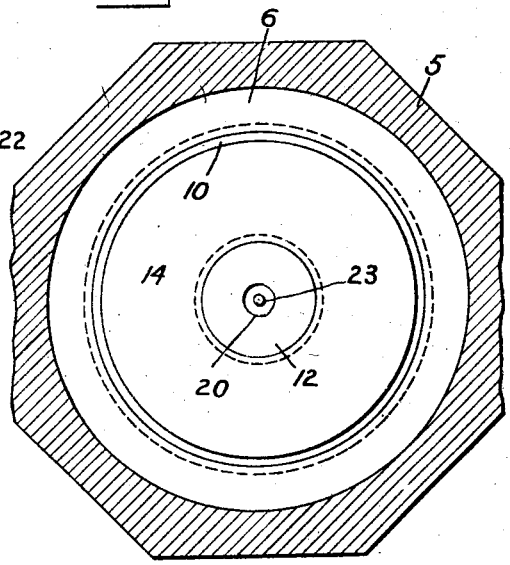
Fig. 4 is a section on the line 4—4 of Fig. 2.

Referring to the drawings by numerals of reference:

We have shown a cylinder 5 provided with a valve casing 6 screw-threaded or otherwise secured in said cylinder. In order to securely lock the valve-casing in the cylinder we have formed the outer face of the casing with spaced peripheral recesses 7. Affixed to the cylinder as by means of a screw 9 is a plate 8 adapted to engage in one of these recesses and thereby to lock the casing against rotation in the cylinder.

The casing at its inner end is provided with a guide 10 which is screw threaded or otherwise secured to the casing. The guide is formed with spaced openings 11 through which air or any suitable fluid may be admitted to the cylinder. For closing these openings we provide a valve 12, which in the preferred embodiment of our invention, is fitted with a stem 13 screw threaded or otherwise secured at its inner end to the valve head 14. The stem 13 at its outer end is provided with an annular flange 15 in which are formed spaced openings 16. The valve-casing 6 is formed intermediate its ends with a ring 17 which serves with the guide 10 as a supporting and guiding means for the valve stem. The ring 17 is provided with openings 18.

In use the air or other fluid is admitted to the cylinder through the openings 16, 18 and 11 in the valve stem, casing and guide, respectively. The valve may be opened by any suitable force.

Any adequate means may be provided for closing the valve automatically when the opening force is no longer exerted. In the preferred embodiment of our invention this automatic closing means involves a spiral spring 19 mounted concentric with the stem 13 of the valve and interposed between the annular flange 15 of the valve and the ring 17 on the valve casing.

For permitting egress of the fluid from the cylinder when pressure is applied therein we form the valve head 14 with a central aperture 20 and with communicating apertures 21. In order to adjustably throttle the flow of fluid out of the cylinder a needle valve 22 is employed, having a head 23 adapted to be seated in the communicating apertures 20 and 21 in the head of the main valve. The needle valve 22 is formed with a hollow stem 24 which is adapted to be mounted concentric with the stem 13 of the main valve, and which is screw threaded as at 25 into the stem of the main valve. A serrated knob 26 is formed on the stem of the needle valve in order to adjust this valve and a leaf spring 27 is attached to this knob and cooperates with notches 28 on the stem 13 of the main valve to retain the needle valve in any adjusted position. As is obvious the needle valve may be adjusted by threading movement of the same in the stem 13.

To prevent rotation of the stem of the main valve during adjustment of the needle valve the annular flange 15 is formed with a projection 29 seating in a notch 30 in the valve casing. The needle valve intermediate its length is provided with apertures 31 through which the air or other fluid may pass either in the open position of the main valve or during the throttling process.

To prevent dust or dirt from entering the cylinder a screen 32 is provided which is seated in the valve casing between the guide 10 and the projection formed by the ring 17.

In practice the air or other fluid passes through the openings 11, 16 and 18, and, to a certain extent, through the openings 31, 20 and 21 in the needle valve, when the main valve is opened. When the main valve is closed and pressure is applied to the fluid in the cylinder it is throttled out of the openings 20 and 21 and 31 in the needle valve.

As above pointed out the valve described is particularly useful in gun recoil mechanism where it may be employed in the recoil cylinder and where the main valve will be opened by suction on recoil, closed automatically by the spring at the end of recoil and where the needle valve will throttle the air admitted to the recoil cylinder so as to prevent violent return of the gun to battery. In this use the needle valve may be adjusted so as to vary the throttling action with varying elevations of the gun.

While we have described the needle valve as mounted concentric with the main valve it is obvious that any other suitable location in the cylinder will none the less enable it to serve its purpose.

We claim:

1. In combination, a cylinder, a valve casing in said cylinder, a valve in said casing, said valve being adapted to be opened by suction, a tubular stem on said valve and a flange on said stem, a ring affixed to said casing and surrounding said stem, said casing, ring and flange being provided with apertures through which fluid is admitted to said cylinder when said valve is opened, means in said casing for straining said fluid, said valve formed with an aperture, a second valve having a stem mounted concentric with the stem of the first named valve, said second named valve adapted to be seated in the aperture of said first valve to throttle the fluid out of said cylinder when pressure is applied thereto and means for adjusting said last named valve.

2. In combination, a cylinder, a valve casing seated in said cylinder, said casing provided with an orifice, a valve seated in said casing adapted to close said orifice, a tubular stem on said valve, a flange on said stem, said valve adapted to be opened by suction to admit fluid into said cylinder through said orifice, a ring fixed to said casing and surrounding said stem, resilient means interposed between said ring and flange and adapted to close said valve automatically when suction ceases, said valve formed with an aperture, a second valve arranged concentric with the stem of the first valve and adapted to be seated in said aperture and adjustable to throttle the flow of fluid from said cylinder when pressure is applied to said fluid.

3. In combination, a cylinder, a valve-casing seated in said cylinder, said casing provided with an orifice through which fluid is admitted to said cylinder, a valve seated in said casing and adapted to close said orifice, said valve adapted to be opened by suction to admit a fluid into said cylinder through said orifice, said valve provided with a stem, a flange on said stem, a ring affixed to said head and surrounding said stem, resilient means interposed between said flange and ring for automatically closing said valve when suction ceases and means for throttling the fluid out of said cylinder when pressure is applied to said fluid.

4. In combination, a cylinder, a valve casing within said cylinder, said casing provided with ports, means for locking the casing in adjusted positions in said cylinder, a valve normally closing the ports adapted to be opened by suction to admit fluid to the cylinder and means carried by the valve for throttling the flow of fluid from the cylinder.

BRYAN P. JOYCE.
DAYTON A. GURNEY.